(12) United States Patent
Han et al.

(10) Patent No.: US 9,074,958 B2
(45) Date of Patent: Jul. 7, 2015

(54) APPARATUS FOR MEASURING THE DEGREE OF VACUUM OF A MULTISTAGE VACUUM HEAT-INSULATING MEMBER, AND MEASUREMENT METHOD USING SAME

(75) Inventors: Jung Pil Han, Ulsan (KR); Jong Kyon Jeong, Ulsan (KR); Son Cheal Bang, Ulsan (KR); Sung Seock Hwang, Cheongju-si (KR)

(73) Assignee: LG HAUSYS, LTD., Seoul (KR)

( * ) Notice: Subject to any disclaimer, the term of this patent is extended or adjusted under 35 U.S.C. 154(b) by 65 days.

(21) Appl. No.: 13/981,549

(22) PCT Filed: Apr. 9, 2012

(86) PCT No.: PCT/KR2012/002671
§ 371 (c)(1),
(2), (4) Date: Jul. 24, 2013

(87) PCT Pub. No.: WO2012/141460
PCT Pub. Date: Oct. 18, 2012

(65) Prior Publication Data
US 2013/0314720 A1      Nov. 28, 2013

(30) Foreign Application Priority Data
Apr. 11, 2011   (KR) .................. 10-2011-0033141

(51) Int. Cl.
*G01L 21/00*   (2006.01)
*G01B 11/16*   (2006.01)

(52) U.S. Cl.
CPC ............... *G01L 21/00* (2013.01); *G01B 11/16* (2013.01)

(58) Field of Classification Search
CPC .................................. G01M 3/36; G01L 21/00
See application file for complete search history.

(56) References Cited

U.S. PATENT DOCUMENTS

| 4,709,578 A |   | 12/1987 | Iwasaki et al. |
| 5,013,384 A |   | 5/1991  | Mellink et al. |
| 5,082,366 A | * | 1/1992  | Tyson et al. .................. 356/35.5 |

(Continued)

FOREIGN PATENT DOCUMENTS

| CN | 101839700 A   | 9/2010 |
| DE | 102006015254 A1 | 10/2007 |

(Continued)

OTHER PUBLICATIONS

International Search Report mailed Oct. 29, 2012 for PCT/KR2012/002671.

(Continued)

*Primary Examiner* — Kara E Geisel
*Assistant Examiner* — Maurice Smith
(74) *Attorney, Agent, or Firm* — Lowe Hauptman & Ham, LLP

(57) ABSTRACT

An apparatus for measuring the degree of vacuum of a multistage vacuum heat-insulating member and to a measurement method using the same includes a chamber in which a plurality of vacuum heat-insulating members are accommodated and which forms a sealed space; a shelf arranged within the chamber so as to support the plurality of vacuum heat-insulating members in a plurality of layers; a displacement sensor for sensing the displacement of each outer shell of the vacuum heat-insulating members stacked on the shelf; and a vacuum unit connected to the chamber so as to regulate the pressure of the internal space of the chamber.

14 Claims, 4 Drawing Sheets

(56) References Cited

U.S. PATENT DOCUMENTS

| | | | |
|---|---|---|---|
| 5,105,654 A * | 4/1992 | Maruyama et al. | 73/49.3 |
| 6,935,183 B2 * | 8/2005 | Ferrario et al. | 73/730 |
| 2003/0088371 A1 | 5/2003 | Parker | |
| 2008/0127716 A1 * | 6/2008 | Eliasson | 73/45.4 |
| 2013/0314720 A1 * | 11/2013 | Han et al. | 356/614 |

FOREIGN PATENT DOCUMENTS

| | | | |
|---|---|---|---|
| EP | 1813928 A2 | 8/2007 | |
| JP | 5992325 A | 5/1984 | |
| JP | S5992325 A * | 5/1984 | G01M 3/363 |
| JP | 61107126 A | 5/1986 | |
| JP | 05079940 | 3/1993 | |
| JP | 07099349 A | 4/1995 | |
| JP | 07270267 | 10/1995 | |
| KR | 19860003505 | 5/1986 | |
| KR | 200132995 | 10/1998 | |

OTHER PUBLICATIONS

Japanese Office Action dated May 23, 2014.
Chinese Office Action dated Jun. 5, 2014.
Japanese Notice of Allowance dated Sep. 5, 2014.

* cited by examiner (a)

(b)

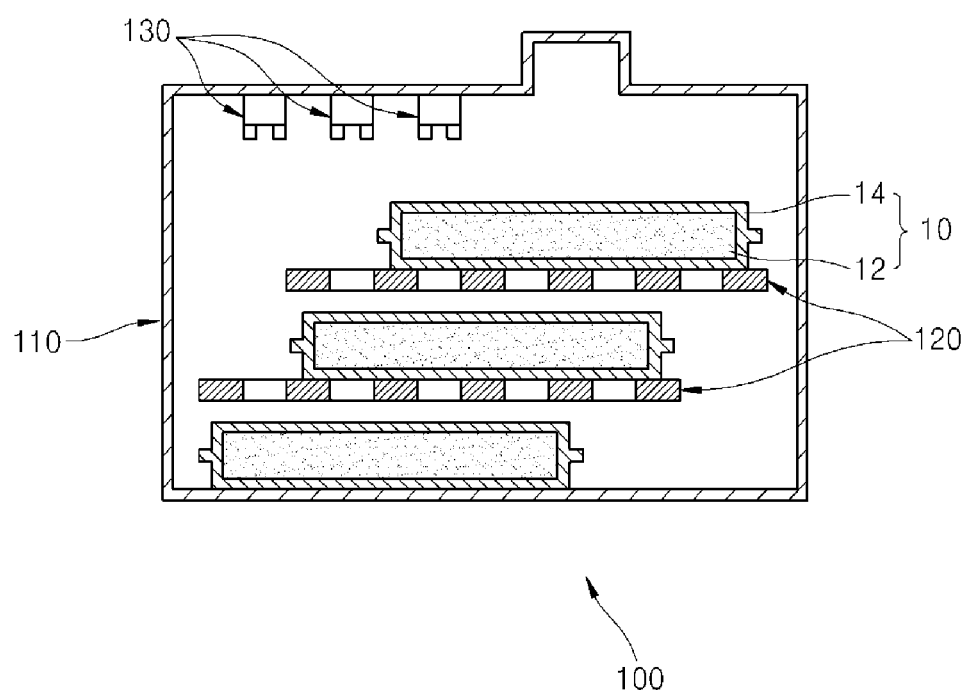

APPARATUS FOR MEASURING THE DEGREE OF VACUUM OF A MULTISTAGE VACUUM HEAT-INSULATING MEMBER, AND MEASUREMENT METHOD USING SAME

CROSS REFERENCE TO RELATED APPLICATION

This application claims the priority of Korean Patent Application No. 10-2011-0033141, filed on Apr. 11, 2011 in the KIPO (Korean Intellectual Property Office). Further, this application is the National Phase application of International Application No. PCT/KR2012/002671 filed on Apr. 9, 2012, which designates the United States and was published in Korean.

TECHNICAL FIELD

The present invention relates to an apparatus for measuring the degrees of vacuum of multistage vacuum heat-insulating panels and a method of measuring the degrees of vacuum of multistage vacuum heat-insulating panels using the same, and more particularly, to an apparatus for measuring the degree of vacuum of a multistage vacuum heat-insulating panel, which can measure the degree of vacuum of a vacuum insulating panel by applying reverse vacuum to the vacuum insulating panel and detecting displacement of the vacuum insulating panel.

BACKGROUND ART

In general, a vacuum insulating panel is formed of a fine porous insulating material and has a very low thermal conductivity. An interior material of the vacuum insulating panel is fumed silica and is surrounded by a multilayered film coated with aluminum. The interior of the vacuum insulating panel is evacuated to provide excellent thermal conductivity.

In measurement of the degree of vacuum of the vacuum insulating panel, a pressure sensor is directly inserted into the vacuum insulating panel. However, this method is a destructive examination and is not suitable for measurement of the degree of vacuum of a mass-produced product.

Therefore, there is a need for a method and apparatus capable of more easily measuring the degree of vacuum of a multistage vacuum heat-insulating panel.

DISCLOSURE

Technical Problem

It is an aspect of the present invention to provide an apparatus for measuring the degree of vacuum of a multistage vacuum heat-insulating panel, in which vacuum insulating panels are disposed in multiple stages inside a vacuum chamber when measuring the degrees of vacuum of the vacuum insulating panels to identify product defects, whereby insulation performance of products can be identified.

It is another object of the present invention to provide a method for measuring the degree of vacuum of a multistage vacuum heat-insulating panel.

Technical Solution

In accordance with one aspect of the present invention, an apparatus for measuring degrees of vacuum of multistage vacuum heat-insulating panels includes: a chamber accommodating a plurality of vacuum insulating panels and providing a closed space; a plurality of shelves placed in the chamber and supporting the plurality of vacuum insulating panels disposed in multiple stages; a plurality of displacement sensors for measuring displacements of sheaths of the vacuum insulating panels placed on the shelves, respectively; and a vacuum unit connected to the chamber to adjust pressure of an interior space of the chamber.

The shelves may be multilayered, and each of the shelves may be formed with through-holes arranged at constant intervals.

Each of the shelves may have an exposed surface through which the plurality of vacuum insulating panels faces a ceiling surface of the chamber.

The apparatus may further include a pressure sensor for measuring a pressure of the chamber.

Each of the displacement sensors may include: a light source unit for generating a laser beam, the light source unit using a laser as a light source; and a light receiving unit for detecting the laser beam reflected by the sheath of the vacuum insulating panel.

The vacuum unit may include a control valve for opening and closing connection of the vacuum unit to the chamber.

In accordance with another aspect of the present invention, an apparatus for measuring degrees of vacuum of multistage vacuum heat-insulating panels includes: a chamber accommodating a plurality of vacuum insulating panels and providing a closed space; a plurality of shelves placed in the chamber and supporting the plurality of vacuum insulating panels in multiple stages; a displacement sensor for measuring displacements of sheaths of the vacuum insulating panels, the displacement sensor being movable in the chamber; and a vacuum unit connected to the chamber to adjust pressure of an interior space of the chamber.

The displacement sensor may include: a light source unit for generating a laser beam, the light source unit using a laser as a light source; and a light receiving unit for detecting the laser beam reflected by the sheath of the vacuum insulating panel.

The apparatus may further include a guide unit disposed at an upper side of the chamber to guide the displacement sensor to slide leftward or rightward.

The guide unit may include: a bogie connected to the displacement sensor and moving the displacement sensor; a slide rail connected to the bogie such that the bogie slides thereon; and a drive motor providing drive power for driving the bogie.

The guide unit may further include a drive switch receiving a user command and controlling operation of the drive motor.

In accordance with a further aspect of the present invention, there is provided a method of measuring the degree of vacuum of multilayered vacuum heat-insulating panels, each including a core and a sheath surrounding the core. The method includes: accommodating a plurality of vacuum insulating panels in an interior space of a chamber; closing the chamber; creating a vacuum in the interior space of the chamber; and measuring displacements of sheaths of the vacuum insulating panels to determine damage of the vacuum insulating panels.

The displacements of the sheaths of the vacuum insulating panels may be measured by a non-contact sensor using a laser beam as a light source.

The non-contact sensor may measure changes of heights of the sheaths as the displacements when a pressure of the chamber is atmospheric pressure and the chamber is under vacuum.

Advantageous Effects

According to the present invention, a plurality of vacuum insulating panels is disposed in multiple stages so that the degrees of vacuum of the vacuum insulating panels can be measured, thereby shortening measurement time while improving productivity.

Further, displacement sensors for measuring displacements of sheaths of vacuum insulating panels can be moved, thereby improving precision in measuring the degrees of vacuum of vacuum insulating panels.

DESCRIPTION OF DRAWINGS

FIG. 6 is a schematic view of shelves in an apparatus for measuring degrees of vacuum of multistage vacuum heat-insulating panels in accordance with another embodiment of the present invention.

BEST MODE

Hereinafter, an apparatus for measuring degrees of vacuum of multistage vacuum heat-insulating panels in accordance with embodiments of the invention and a method of measuring degrees of vacuum of multistage vacuum heat-insulating panels using the same will be described in detail.

Figure 1:
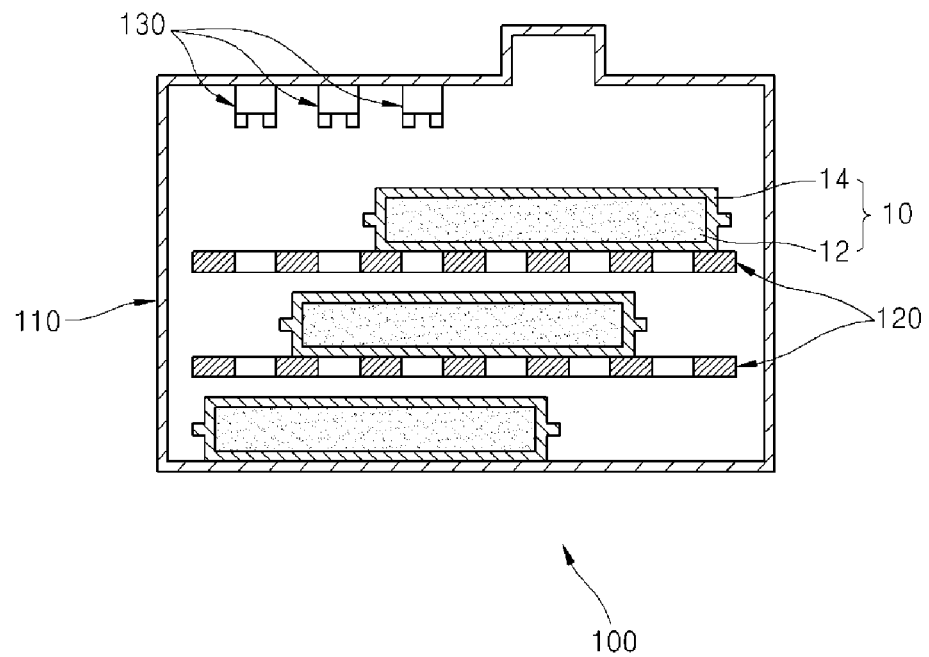
FIG. 1 is a schematic sectional view of an apparatus for measuring degrees of vacuum of multistage vacuum heat-insulating panels in accordance with one embodiment of the present invention.

FIG. 1 is a schematic sectional view of an apparatus for measuring degrees of vacuum of multistage vacuum heat-insulating panels in accordance with an embodiment of the present invention.

FIG. 1 shows only main features of the invention to aid in clear understanding of the invention. As a result, the illustration may be variously modified and the scope of the invention is not limited to specific shapes shown in the drawings.

Referring to FIG. 1, an apparatus 100 for measuring degrees of vacuum of multistage vacuum heat-insulating panels includes a chamber 110, a plurality of shelves 120 placed in the chamber 110 and supporting a plurality of vacuum insulating panels disposed in multiple stages, displacement sensors 130 for measuring displacements of sheaths 14 of the vacuum insulating panels 10, and a vacuum unit for adjusting an inner pressure of the chamber 110.

The vacuum insulating panel 10 includes a core 12 formed of a porous material for creating an interior vacuum space, and a sheath 14 including a gas bather film surrounding the core 12 to maintain the interior under vacuum, and refers to an insulating panel obtained by reducing a pressure of the core 12 to a vacuum and then sealing the core 12.

First, the chamber 110 accommodates a plurality of vacuum insulating panels 10 and provides a closed space. When measuring the degrees of vacuum of the vacuum insulating panels, it is necessary to evacuate the chamber 110.

Here, conditions for identifying defects of the vacuum insulating panels 10 may be provided only after the chamber 110 is evacuated.

Next, the shelves 120 are placed in the chamber 110 to support the plurality of vacuum insulating panels 10 in multiple stages.

Further, the shelves 120 may have exposed surfaces (not shown) through which the plural vacuum insulating panels 10 face a ceiling surface of the chamber 110.

Next, the displacement sensors 130 are connected to the ceiling of the chamber 110.

The displacement sensors 130 measure displacements of the sheaths 14 of the vacuum insulating panels 10, respectively. Here, the displacement refers to a change in height of the sheaths 14.

That is, the displacement sensors 130 are placed in the chamber 110 to measure the height change of the sheaths 14 of the vacuum insulating panels 10 according to pressure change.

Next, the vacuum unit 140 is connected to the chamber 110 and adjusts the pressure of the chamber so as to form a space enclosed by the chamber 110.

Figure 2:
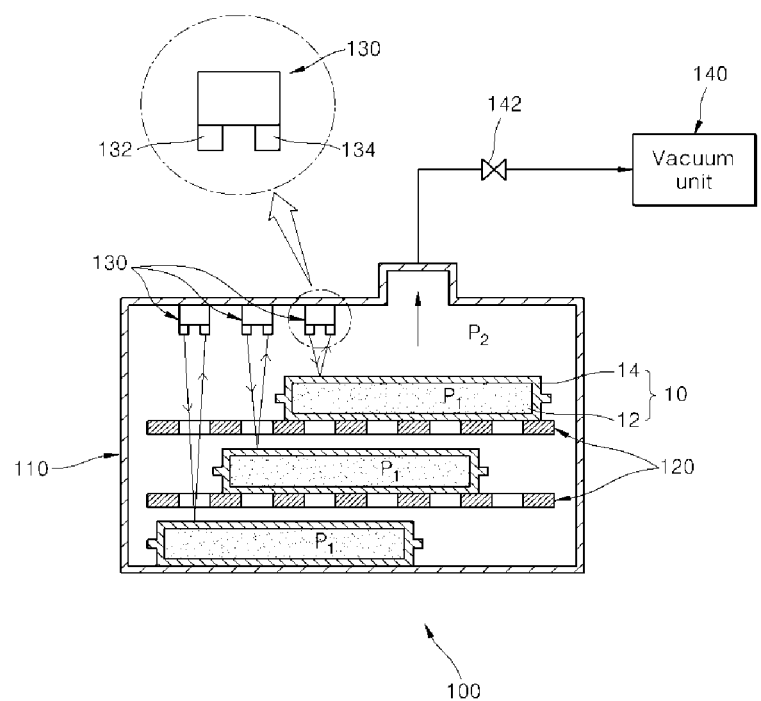
FIG. 2 is a view schematically showing operation of the apparatus for measuring degrees of vacuum of multistage vacuum heat-insulating panels in accordance with the embodiment of the present invention.

FIG. 2 is a sectional view schematically showing operation of the apparatus in accordance with the embodiment of the present invention.

Referring to FIG. 2, the apparatus 100 for measuring degrees of vacuum of multistage vacuum heat-insulating panels includes the chamber 110, the plurality of shelves 120 placed in the chamber 110 to support a plurality of vacuum insulating panels in multiple stages, the displacement sensors 130 for measuring displacements of sheaths 14 of the vacuum insulating panels 10, and the vacuum unit for adjusting an inner pressure of the chamber 110.

The description given with reference to FIG. 1 will not be repeated.

Next, the displacement sensors 130 and the vacuum unit 140 will be described in detail, and operations thereof will be described.

First, the displacement sensors 130 will be described.

The displacement sensors 130 are placed in the chamber 110 to measure displacements of the sheaths 14 of the vacuum insulating panels 10 according to pressure change.

Each of the displacement sensors 130 includes a light source unit 132 generating a laser beam, and a light receiving unit 134 detecting the laser beam.

The light source unit 132 employs a laser as a light source and generates a laser beam.

The light receiving unit 134 detects a laser beam reflected by the sheath 14 of the vacuum insulating panel 10.

That is, when a laser beam is emitted from the light source unit 132, the laser beam reaches the sheath 14 of the vacuum insulating panel 10 and is reflected toward the light receiving unit 134, whereby a displacement of the vacuum insulating panel 10 can be measured according to a detection value obtained in this manner.

As shown, the displacement sensors 130 are placed at several locations on the ceiling surface of the chamber 110 to measure the degrees of vacuum of the vacuum insulating panels 10 disposed in multiple stages.

The degrees of vacuum of the vacuum insulating panels 10 may be simultaneously measured through the displacement sensors 130. As a result, productivity can be enhanced by reducing measurement time.

Next, the vacuum unit 140 will be described.

The vacuum unit 140 is connected to the chamber 110 and adjusts a pressure of the chamber so as to form a space enclosed by the chamber 110.

The vacuum unit 140 may further include a control valve 142 for opening and closing connection between the vacuum unit 140 and the chamber 110.

Here, the control valve 142 is formed to close the interior space of the chamber 110 and serves to adjust pressure applied to the chamber 110. Accordingly, the chamber 110 is inversely evacuated from the outside so that the interior space of the chamber 110 can be evacuated.

The apparatus 100 for measuring degrees of vacuum of multistage vacuum heat-insulating panels has been described. Hereinafter, operation of the components thereof will be described.

First, a plurality of vacuum insulating panels 10 is placed in multiple stages in the chamber 110. The plurality of vacuum insulating panels 10 may be disposed on the shelves 120 formed in multiple stages inside the chamber 110, respectively. Here, measured areas of the shelves 120 are perforated so that the displacement sensors 130 can easily measure the degrees of vacuum of the vacuum insulating panels 10.

With the vacuum insulating panels 10 and the shelves 120 disposed in the chamber 110, the chamber 110 is evacuated by the vacuum unit 140 connected to the outside. Here, the vacuum unit 140 may open or close connection between the vacuum unit 140 and the chamber 110 through the control valve 142. Here, when the interior space of the chamber 110 is evacuated through the control valve 142, the pressure sensor (not shown) can measure an inner pressure of the chamber 110 to identify a vacuum state of the chamber 110.

Then, defects of the vacuum insulating panels 10 can be measured by detecting displacements of the sheaths 14 of the vacuum insulating panels 10 through the displacement sensors 130 placed at several locations on the ceiling surface of the chamber 110.

Here, when a certain vacuum insulating panel 10 has a defect, the sheath 14 of the panel 10 is expanded due to a difference between an internal pressure P1 of the vacuum insulating panel 10 and an external pressure P2 thereof.

That is, when a defect is generated in the vacuum insulating panel 10 during a manufacturing process thereof, air is introduced into the vacuum insulating panel 10, so that the internal pressure P1 of the vacuum insulating panel 10 reaches atmospheric pressure and the sheath 14 is expanded due to a difference between the internal pressure P1 of the vacuum insulating panel 10 and the external pressure P2 thereof. Accordingly, the defect of the vacuum insulating panel 10 can be detected.

Figure 3:
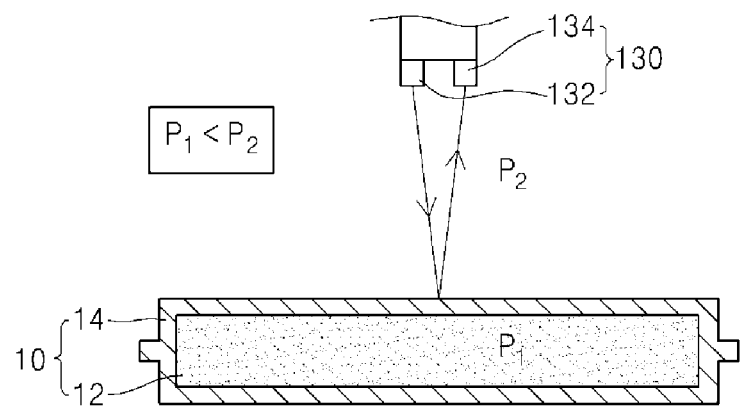
FIG. 3 is a schematic view of a method of measuring degrees of vacuum of multistage vacuum heat-insulating panels in accordance with one embodiment of the present invention, showing one example of detecting defects using the method.
Figure 3:
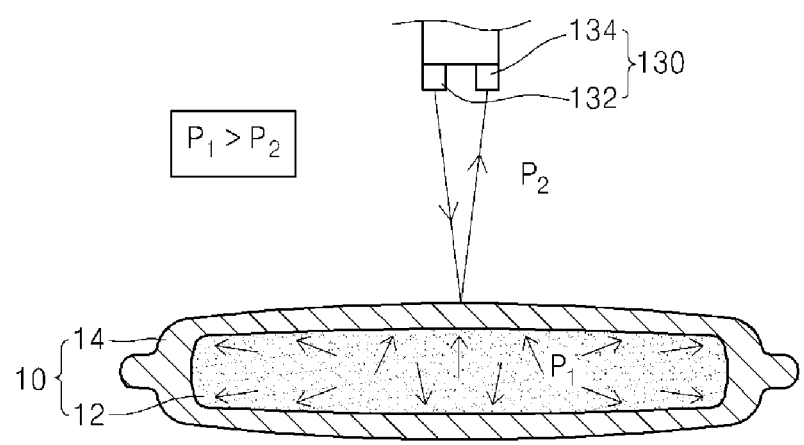

FIG. 3 is a view showing a method of measuring degrees of vacuum of multistage vacuum heat-insulating panels in accordance with one embodiment of the invention, showing one example of detecting defects using the method.

In FIG. 3, (a) shows a normal state of a vacuum insulating panel in measurement of vacuum using the method, and (b) shows a defect of the vacuum insulating panel.

First, referring to (a) in FIG. 3, a degree of vacuum of the vacuum insulating panel 10 including a core 12 and a sheath 14 surrounding the core 12 is measured by the displacement sensor 130.

Here, when an internal pressure P1 of the vacuum insulating panel 10 is lower than an external pressure P2 thereof, it can be identified that the vacuum insulating panel 10 is in a normal state. That is, since introduction of air into the vacuum insulating panel 10 is blocked, no displacement occurs in the vacuum insulating panel.

As a result, a laser beam emitted from the light source unit 132 reaches the sheath 14 of the vacuum insulating panel 10 and is reflected towards the light receiving unit 134, whereby a displacement of the vacuum insulating panel 10 can be measured according to a detection value obtained in this manner.

Next, referring to (b) of FIG. 3, a height change of the sheath 14 of the vacuum insulating panel 10 can be identified. Specifically, the internal pressure P1 of the vacuum insulating panel 10 becomes higher than the external pressure P2 of the vacuum insulating panel 10, allowing air to be introduced into the vacuum insulating panel 10.

Accordingly, the internal pressure P1 of the vacuum insulating panel 10 reaches atmospheric pressure, and thus a difference between the internal and outer pressures P1 and P2 of the vacuum insulating panel 10 occurs. Thus, as shown, the sheath 14 of the vacuum insulating panel 10 is expanded.

Change in height of the vacuum insulating panel 10 increasing the volume of the vacuum insulating panel 10 shows that the vacuum insulating panel 10 is damaged and not evacuated.

Figure 4:
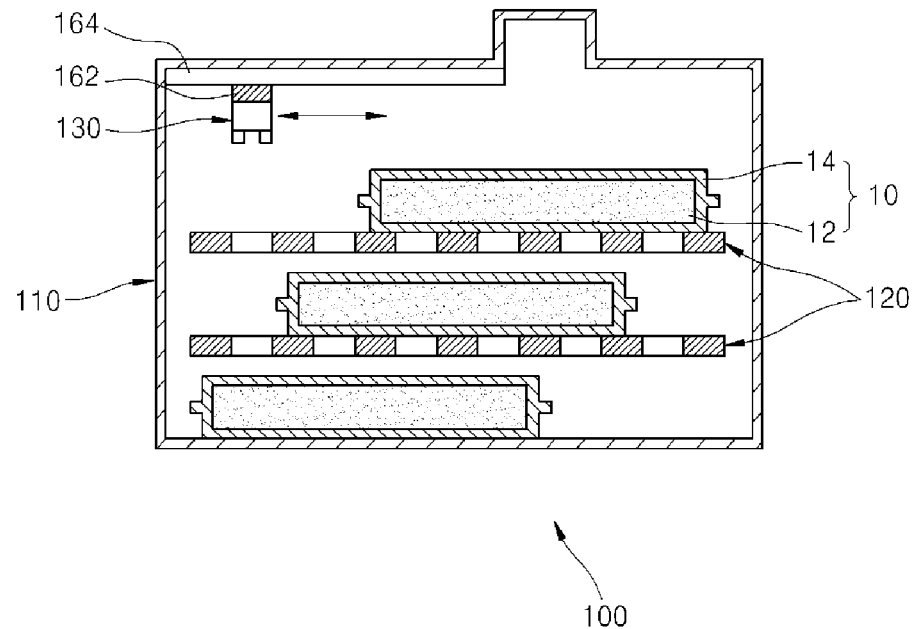
FIG. 4 is a schematic sectional view of an apparatus for measuring degrees of vacuum of multistage vacuum heat-insulating panels in accordance with another embodiment of the present invention.

FIG. 4 is a schematic sectional view of an apparatus for measuring degrees of vacuum of multistage vacuum heat-insulating panels in accordance with another embodiment of the present invention.

The apparatus shown in FIG. 4 is substantially the same as the apparatus 100 shown in FIGS. 1 to 3 excluding the features of the displacement sensor 130.

Specifically, the displacement sensors 130 of FIGS. 1 to 3 are disposed at several places on the ceiling surface of the chamber 110 to measure displacements of the sheath 14 of the vacuum insulating panel 10, whereas the displacement sensor 130 of FIG. 4 is movable, whereby displacements of the sheaths 14 of the vacuum insulating panels 10 disposed in multiple stages can be measured by a single displacement sensor 130.

Movement of the displacement sensor 130 may be achieved by a bogie 162 connected to the displacement sensor 130 to be moved leftward or rightward, and a slide rail 164 corresponding to a path along which the bogie 162 is moved.

Figure 5:
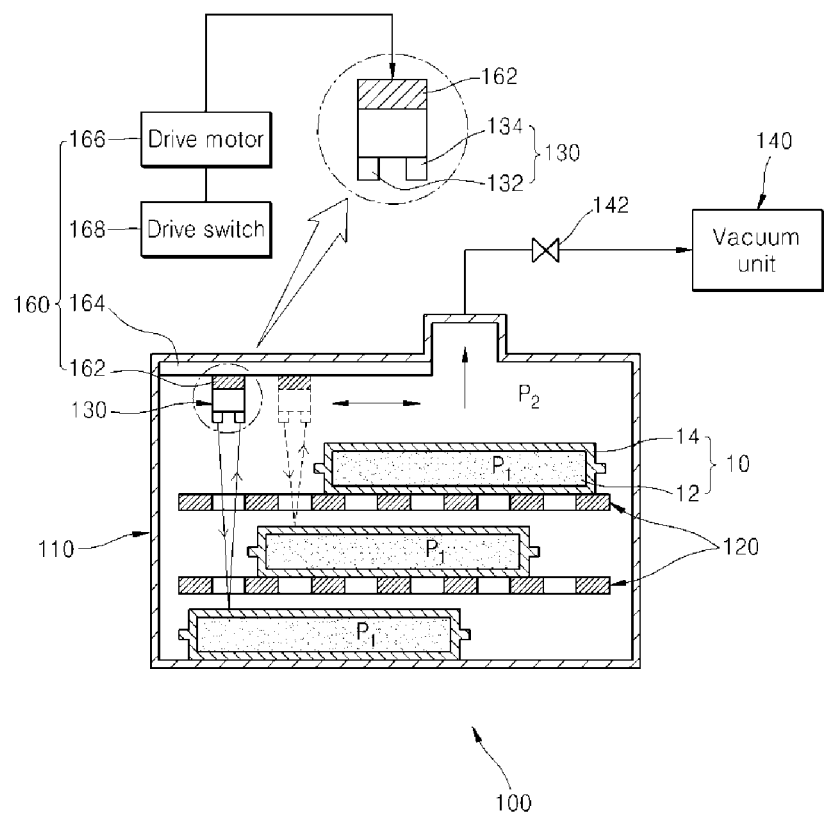
FIG. 5 is a view schematically showing operation of the apparatus for measuring degrees of vacuum of multistage vacuum heat-insulating panels in accordance with the other embodiment of the present invention.

FIG. 5 is a view schematically showing operation of the apparatus for measuring degrees of vacuum of multistage vacuum heat-insulating panels in accordance with this embodiment.

Referring FIG. 5, an apparatus 100 for measuring degrees of vacuum of multistage vacuum heat-insulating panels includes a chamber 110 defining an accommodating space therein, a plurality of shelves 120 placed in the chamber 110 to support a plurality of vacuum insulating panels in multiple stages, a displacement sensor 130 movable in the chamber 110 to measure displacements of sheaths 14 of the vacuum insulating panels 10, and a vacuum unit for adjusting a pressure of an interior space of the chamber 110.

The apparatus 100 further includes a guide unit 160 disposed at an inner upper side of the chamber 110 to guide the displacement sensor to slide leftward or rightward.

Here, the guide unit 160 includes a bogie 162 connected to the displacement sensor 130, a slide rail 164 disposed on the inner upper side of the chamber 110 such that the bogie 162 can slide thereon, a drive motor 166 providing drive power to the bogie 162, and a drive switch 168 controlling operation of the drive motor 166.

Here, only operation of measuring displacements of the sheaths 14 of the vacuum insulating panel 10 through movement of the displacement sensor 130 will be described. Repeated descriptions of the components will be omitted.

The displacement sensor 130 may measure displacements of the sheaths 14 of the vacuum insulating panels 10 disposed in multiple stages while sliding leftward or rightward.

The guide unit 160 is configured to move the displacement sensor 130.

In more detail, the bogie 162 connected to the displacement sensor 130 may be moved through manipulation of the drive switch 168 while electric power is supplied from the outside.

As the drive switch 168 is operated according to a user command, the bogie 162 is moved along the slide rail 164. Here, power for driving the bogie 162 may be supplied by the drive motor 166.

Accordingly, the displacement sensor 130 connected to the movable bogie 162 can be slid leftward or rightward. Here, when the light source unit 132 emits a laser beam toward the sheath 14 of the vacuum insulating panel 10, the light receiving unit 134 detects the laser beam reflected by the sheath 14.

A defect of the vacuum insulating panel 10 is examined by comparing and analyzing detection data. As a result, the displacement sensor 130 can be moved by the bogie 162, and the degree of vacuum of the vacuum insulating panel 10 can be precisely examined through such a process.

Further, as the degrees of vacuum of a plurality of vacuum insulating panels 10 can be examined at the same time, it is possible to reduce measurement time while improving productivity.

FIG. 6 is a schematic view of modification of shelves in the apparatus for measuring degrees of vacuum of multistage vacuum heat-insulating panels in accordance with the embodiment of the present invention.

Referring to FIG. 6, the shelves 120 of the apparatus 100 are modified.

The shelves 120 are multilayered. Here, each of the shelves may be formed with through-holes (not shown).

The displacement sensors 130 may easily measure the degrees of vacuum of the vacuum insulating panels 10 through the through-holes.

As such, the plural vacuum insulating panels are disposed in multiple stages in measurement of the degrees of vacuum of the vacuum insulating panels, measurement time may be reduced. Furthermore, productivity may be enhanced.

Further, according to the present invention, measurement precision of the degrees of vacuum of the vacuum insulating panels may be increased by providing mobility to the displacement sensor for measuring displacements of sheaths of the vacuum insulating panel.

Although the present invention has been described with reference to some embodiments and the accompanying drawings, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. An apparatus for measuring a degree of vacuum of a multistage vacuum heat-insulating panel, the apparatus comprising:
    a chamber accommodating a plurality of vacuum insulating panels and providing a closed space;
    a plurality of shelves placed in the chamber and supporting the plurality of vacuum insulating panels disposed in multiple stages;
    a plurality of displacement sensors configured to measure displacements of sheaths of the vacuum insulating panels placed on the shelves, respectively; and
    a vacuum unit connected to the chamber, and configured to adjust a pressure of an interior space of the chamber.

2. The apparatus according to claim 1, wherein the shelves are multilayered, and each of the shelves comprises through-holes arranged at constant intervals.

3. The apparatus according to claim 1, wherein each of the shelves comprises an exposed surface through which the plurality of vacuum insulating panels face a ceiling surface of the chamber.

4. The apparatus according to claim 1, further comprising:
    a pressure sensor configured to measure the pressure of the chamber.

5. The apparatus according to claim 1, wherein each of the displacement sensors comprises:
    a light source configured to generate a laser beam; and
    a light detector configured to detect the laser beam reflected by the sheath of the vacuum insulating panel.

6. The apparatus according to claim 1, further comprising:
    a control valve configured to open and close a connection between the vacuum unit and the chamber.

7. An apparatus for measuring a degree of vacuum of a multistage vacuum heat-insulating panel, the apparatus comprising:
    a chamber accommodating a plurality of vacuum insulating panels and providing a closed space;
    a plurality of shelves placed in the chamber and supporting the plurality of vacuum insulating panels disposed in multiple stages;
    a displacement sensor configured to measure displacements of sheaths of the vacuum insulating panels, the displacement sensor being movable in the chamber; and
    a vacuum unit connected to the chamber, and configured to adjust a pressure of an interior space of the chamber.

8. The apparatus according to claim 7, wherein the displacement sensor comprises:
    a light source configured to generate a laser beam; and
    a light detector configured to detect the laser beam reflected by the sheaths of the vacuum insulating panels.

9. The apparatus according to claim 7, further comprising:
    a guide unit disposed at an upper side of the chamber, and configured to guide the displacement sensor to slide leftward or rightward.

10. The apparatus according to claim 9, wherein the guide unit comprises:
    a bogie connected to the displacement sensor, and configured to move the displacement sensor;
    a slide rail connected to the bogie, and configured for the bogie to slide thereon; and
    a drive motor configured to provide power for driving the bogie.

11. The apparatus according to claim 10, wherein the guide unit further comprises:
    a drive switch configured to
        receive a user command, and
        control driving of the drive motor.

12. A method of measuring a degree of vacuum of a vacuum heat-insulating panel comprising a core and a sheath surrounding the core, the method comprising:
    accommodating a plurality of vacuum insulating panels in an interior space of a chamber;
    closing the chamber;
    creating a vacuum in the interior space of the chamber; and
    measuring, by at least one displacement sensor, displacements of sheaths of the vacuum insulating panels to determine damage of the vacuum insulating panels, wherein the vacuum insulating panels are disposed in multiple stages and supported by a plurality of shelves placed in the chamber.

13. The method according to claim 12, wherein the at least one displacement sensor comprises a non-contact sensor which uses a laser beam as a light source.

14. The method according to claim 13, wherein the at least one non-contact sensor measures changes of heights of the sheaths as the displacements when a pressure of the chamber is atmospheric pressure and when the chamber is under vacuum.

\* \* \* \* \*